3,376,364
POLYPHOSPHITE STABILIZERS FOR POLYMERIC MATERIALS

Millard S. Larrison, Livingston, N.J., assignor to Weston Chemical Corporation, Newark, N.J., a corporation of New Jersey
No Drawing. Application Jan. 24, 1966, Ser. No. 522,395, now Patent No. 3,341,629, dated Sept. 12, 1967, which is a continuation-in-part of applications Ser. No. 366,891, May 12, 1964, and Ser. No. 376,202, June 18, 1964. Divided and this application June 29, 1967, Ser. No. 649,817
The portion of the term of the patent subsequent to Sept. 12, 1984, has been disclaimed
27 Claims. (Cl. 260—899)

---

ABSTRACT OF THE DISCLOSURE

Polymeric phosphites are prepared by reacting a hydrogenated dihydric phenol or an aromatic dihydric alcohol with a tertiary alkyl, aryl or haloaryl phosphite and stopping the condensation when 50 to 90%, most preferably 65 to 75%, of the theoretical amount of monohydric alcohol or phenol is formed. The most preferred material is that made from hydrogenated bisphenol A and triphenyl phosphite in which the product obtained has 6.3 to 6.8% phosphorus. The phosphites are useful in stabilizing halogen containing polymers (particularly vinyl chloride resins) and hydrocarbon polymers and are also useful as flame proofing agents for hydrocarbon polymers, cellulose and cellulose esters.

---

This application is a division of application 522,395 filed Jan. 24, 1966, now U.S. Patent 3,341,629 and is a continuation-in-part of applications Ser. No. 376,202, filed June 18, 1964, now U.S. Patent 3,356,770 and Ser. No. 366,891, filed May 12, 1964.

This invention relates to novel phosphite polymers.

In the thermoplastics industry, stabilization of the thermoplastic resins, e.g. polyvinyl chloride and polypropylene, by the use of barium, cadmium, zinc, tin, lead and phosphite systems to prevent degradation from heat, light and weathering has contributed to the rapid growth into markets which were earlier closed to many plastics and has also greatly accelerated the rate of growth in many established areas.

The incorporation of liquid organic phosphates, e.g. see Leistner Patent No. 2,564,646, in stabilizing vinyl chloride resins has given spectacular improvements. However, in many cases the liquids are difficult or impossible to use and as a result many attempts have been made to prepare the organic phosphite in solid form, preferably as a hard, frangible material that can be easily ground or powdered. These efforts have met with indifferent success in that the solids have been soft, waxy, unctuous, difficult to maintain in finely divided condition and/or susceptible to rapid hydrolysis.

It is an object of the present invention to make novel polymeric phosphites.

Another object is to make solid phosphites that can be incorporated into various plastic and elastic compositions as stabilizers.

An additional object is to prepare novel phosphite polymers having improved resistance to hydrolysis.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the objects can be attained by reacting a trihydrocarbyl phosphite or trihaloaryl phosphite with an aromatic dihydric alcohol or more preferably with a hydrogenated dihydric phenol, i.e. a dihydric alcohol resulting from the hydrogenation of a dihydric phenol (also called a hydrogenated bisphenol).

The reaction is preferably catalyzed with 0.1–5% by weight of the trihydrocarbyl phosphite of a dialkyl phosphite, a diaryl phosphite, a dihaloaryl phosphite or of an alkaline catalyst such as an alkali metal alcoholate or phenolate. As examples of catalysts there can be used diphenyl phosphite, didecyl phosphite, phenyl decyl phosphite, di(2-methylphenyl)phosphite, di(4-dodecylphenyl) phosphite, di(2-chlorophenyl)phosphite, di(2,4-dimethylphenyl)phosphite, di(4-bromophenyl)phosphite, diethyl phosphite, dicyclohexyl phosphite, dioctadecyl phosphite, sodium phenolate, sodium decylate, potassium cresylate, sodium ethylate and sodium octadecanolate. Diphenyl phosphite and similar diaryl phosphites are the preferred catalysts.

It has been proposed previously to prepare polymeric pentaerythritol phosphite esters by reacting diphenyl pentaerythritol diphosphite and the like with a dihydric phenol or dihydric alcohol, Friedman Patent 3,053,878. The compounds of the present invention have superior hydrolytic stability to those of the Friedman patent.

As the trihydrocarbyl or trihaloaryl phosphite reactant there can be used triphenyl phosphite, tris(2-methylphenyl)phosphite, tris(3-methylphenyl)phosphite, tris(4-methylphenyl)phosphite, tris(2-ethylphenyl)phosphite, tris(2-isopropylphenyl)phosphite, tris(4-dodecylphenyl) phosphite, tris(2,4-dimethylphenyl)phosphite, tris(2-chlorophenyl)phosphite, tris(2-bromophenyl)phosphite, tris (2-fluorophenyl)phosphite, tris(4-t-butylphenyl)phosphite, tris decyl phosphite, tris octyl phosphite, tris(alpha naphthyl)phosphite, dipenyl 4-methylphenyl phosphite. The preferred phosphite reactants are triaryl phosphites, most preferably triphenyl phosphite.

As aromatic dihydric alcohols there can be used p-xylylene glycol, m-xylylene glycol, O-xylylene glycol and 1,4-cyclohexanedimethanol.

As the hydrogenated dihydric phenol there can be used 4,4'-isopropylidene dicylcohexanol (also called bis(4-hydroxycyclohexyl)dimethyl methane or hydrogenated bisphenol A), di(p-hydroxycyclohexyl)methyl ethyl methane, di(4-hydroxycyclohexyl)methane. The preferred dihydric compound is hydrogenated bisphenol A since it gives the best products.

To prepare the compounds of the present invention there are employed 0.5 to 1.5 mols of trihydrocarbyl phosphite or the like per mol of the dihydric compound, e.g. hydrogenated bisphenol A. Preferably there are used about 2 moles of trihydrocarbyl phosphite for 3 moles of diol, e.g. hydrogenated bisphenol A.

The reaction can be continued until a cross linked or highly branched polymer is formed. Preferably, however, the reaction is stopped while the product is still in the substantially linear or thermoplastic stage. When using the preferred reactants, namely hydrogenated bisphenol A and triphenyl phosphite, the reaction is stopped while the product has 6.3–6.8% phosphorus by weight. Thus, under the preferred conditions, the reaction is stopped when 65–75% of the theoretical amount of phenol derived from the triphenyl phosphite or the like is removed by distillation.

The reaction can be continued until 90% of the theoretical amount of phenol (i.e. from triphenyl phosphite) has been recovered but this is not preferred since it gives a crosslinked thermosetting polymer. It is also possible to stop the reaction when only 50% of the theoretical amount of phenol has been recovered but in such case the thermoplastic polymer usually has not advanced to a stage giving optimum properties.

When using triphenyl phosphite and hydrogenated bisphenol A as the reactants, it has been observed that the greater the amount of phenol removed within the limits of 6.3 to 6.8% phosphorus content in the polymer formed, the less the color of the polymer. If the distillation is continued much beyond the point of 6.8% phosphorus content in the polymer, gel-like, i.e. crosslinked materials, are formed rather than the preferred thermoplastic materials. The reaction is normally carried out with the aid of heat. The reaction can be continued as long as the phenol-by-product is removed. Conveniently the phenol formed is removed by vacuum equivalent to 15 mm. absolute pressure or less.

Linear materials can be formed having the formula

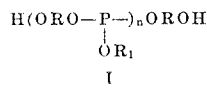

where R is the divalent residue of (a) bis-(hydroxyalkyl) benzenes, or (b) the hydrogenated dihydric phenol, and $R_1$ is aryl, haloaryl or alkyl and $n$ is an integer of 1 or more, e.g., 10, 50 or 200.

Nelson Patent No. 2,612,488 shows making phosphite polymers from dihydric phenols. The procedure of Nelson involving the use of phosphorus trichloride or the like creates problems in obtaining a pure halogen free product, particularly if the reaction is stopped prior to completion. The Nelson procedure also cannot be employed with the cycloaliphatic dihydric alcohols employed in the present invention because the alcohols react with phosphorus trichloride or the like to form organic halides. These in turn can react further to form phosphonates rather than the desired thermoplastic polymeric phosphites.

The products obtained according to the invention are brittle solid resins at room temperature. They can be readily ground for incorporation in an amount of 0.01 to 20% into halogen containing resins, e.g. vinyl chloride resins, as stabilizers against heat and light. They can also be incorporated in an amount of 0.01 to 20% as stabilizers for hydrocarbon polymers such as polyethylene, polypropylene, ethylene-propylene copolymers (e.g. a 50:50 copolymer), polystyrene, acrylonitrile-butadiene-styrene terpolymer, natural rubber, rubbery butadiene-styrene copolymer, polybutadiene, polyisobutylene, isobutylene-butadiene copolymer (butyl rubber) and the like. In some instances, it is desirable to also incorporate a phenolic antioxidant such as 2,2-methylene bis(4-methyl-6-t-butyl phenol) or 2,4,6-tri-t-butyl phenol.

The products can also be used as antioxidants with barium, cadmium and zinc salts and synergistic activity has been noted in this connection. Thus there can be included 1-10% of salts such as barium-cadmium laurate, zinc stearate, cadmium 2-ethylhexoate, barium nonylphenolate, barium octylphenolate, barium stearate, zinc octoate in the antioxidant formulations.

The resins of the present invention can also be incorporated in an amount of 1 to 50% in other plastic materials to give improved flame and/or fire resistance. Thus they can be used to improve the fire resistance of cellulose, cellulose acetate, cellulose nitrate, cellulose acetate-butyrate, polystyrene, polyethylene, polypropylene and other polymeric monoolefins.

The resins of the present invention are also suitable to form cast or molded articles, e.g. disposable cups.

The initial heating for the reaction is preferably done slowly to avoid an explosion. After initial reaction at about 100 to 110° C., the reaction mass is heated above 150° C., e.g. to 180° C., and then vacuum distilled to remove the by-product phenol.

Unless otherwise indicated, all parts and percentages are by weight.

Example 1

240 parts of hydrogenated bisphenol A, 341 parts of triphenyl phosphite, 84 parts of t-octylphenol and 6 parts of diphenyl phosphite were mixed and subjected to vacuum distillation until the temperature reached 214° C. with a vacuum of 29.5 inches. 222 parts of distillate were removed. The residue was a solid polymer with a phosphorus content of 7.6%. It was compatible in resins, e.g. polyvinyl chloride, and polypropylene and natural and synthetic rubbers and exerted a stabilizing effect. It was particularly effective in combination with conventional stabilizing systems such as phenols and barium and cadmium soaps.

Example 2

775 parts of a triphenyl phosphite, 480 parts of hydrogenated bisphenol A and 10 parts of diphenyl phosphite were mixed and subjected to vacuum distillation. Terminal conditions were 208° C. and 29.5 inches of vacuum. 363 parts of phenol were removed from the system. The residue was a resinous polymer with a phosphorus content of 8.7%.

Example 3

341 parts of triphenyl phosphite, 240 parts of hydrogenated bisphenol A, and 6 parts of diphenyl phosphite were mixed and subjected to vacuum distillation. Terminal conditions were 216° C. and 29.5 inches of vacuum. The residue was a resinous polymer with a phosphorus content of 8.4%.

Example 4

1860 parts of triphenyl phosphite, 2160 parts of hydrogenated bisphenol A and 24 parts of diphenyl phosphite were mixed and subjected to vacuum distillation as in Example 3. 1112 parts of phenol distillate were removed. The residue was a hard amber-colored resin with a phosphorus content of 6.3%. The product is one of the preferred ones according to the invention and was compatible with and displayed antioxidant activity in stabilizing plastics, e.g. polyvinyl chloride, polyethylene, polypropylene, natural rubber and synthetic rubber. It was particularly effective in plastics when used in combination with conventional barium, zinc and cadmium stabilizers.

Example 5

62 parts of triphenyl phosphite were mixed with 41 parts of p-xylylene glycol. The temperature was maintained in the temperature range, 100 to 110° C. for 20 minutes. The glycol dissolved slowly to give a clear viscous liquid. The temperature was then slowly raised to 115° C. and finally to 220° C. The product was finally distilled under 5 mm. Hg pressure at 200° C. The final product was a light colored, brittle solid, at room temperature and has a phosphorus content of 11%.

Example 6

240 parts of hydrogenated bisphenol A, 326 parts of triphenyl phosphite and 4 parts of diphenyl phosphite were mixed and subjected to vacuum distillation. Terminal conditions were 210° C. and 29.5 inches of vacuum. A total of 170 parts of phenol were removed by the distillation. The product was a hard polymer with a phosphorus content of 8.1%.

Example 7

341 parts of triphenyl phosphite, 150 parts of 1,4-cyclohexanedimethanol and 6 parts of diphenyl phosphite were mixed and subjected to vacuum distillation. Terminal conditions were 158° C. and 5 mm. Hg absolute pressure. 210 parts of distillate were removed. The product was a clear white solid resinous polymer with a phosphorus content of 12%.

Example 8

2160 parts of hydrogenated bisphenol A, 1860 parts of triphenyl phosphite and 24 parts of diphenyl phosphite were mixed and subjected to vacuum distillation. Terminal conditions were 205° C. and 29.5 inches of vacuum. 1140 parts of distillate were removed. The still residue was a clear solid resin with a phosphorus content of 6.4%. This product is one of the preferred ones according to the invention.

having a molecular weight of 1834, phosphorus content of 6.7% and a hydroxyl number of 91.

If 4.67 mols of phenol are stripped out (14 mols from 3 Triads) the formula of the product is

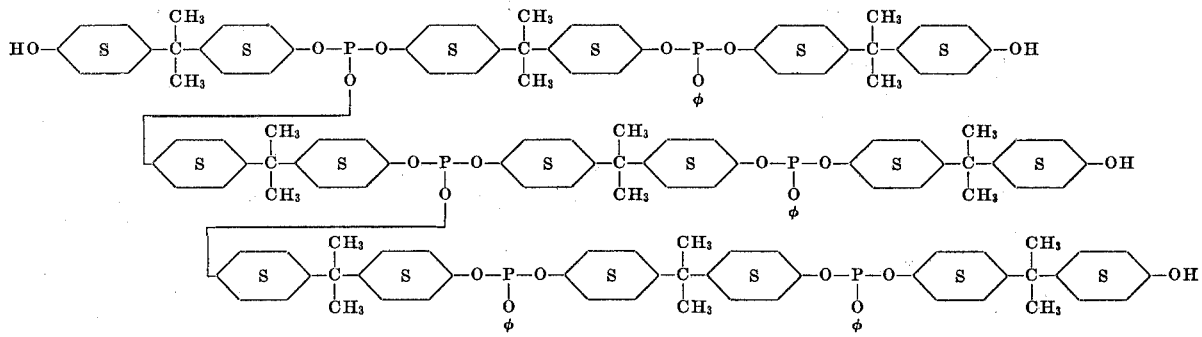

having a molecular weight of 2704, phosphorus content of 6.8% and hydroxyl number of 82.

The following table summarizes the products obtained by reacting TPP with HBPA in the ratio of 2 mols to 3 mols:

TABLE 1

| Triads, n | Phenol Out (Mols) | | Molecular Wt. of Polymer | P Atoms/ Molecule | P, Percent | Hydroxyl | |
|---|---|---|---|---|---|---|---|
| | Total | Per n | | | | Groups/ Molecule | No. |
| 1 | 4 | 4 | 964 | 2 | 6.4 | 2 | 116 |
| 2 | 9 | 4.5 | 1,834 | 4 | 6.7 | 3 | 91 |
| 3 | 14 | 4.67 | 2,704 | 6 | 6.8 | 4 | 82 |
| 4 | 19 | 4.75 | 3,574 | 8 | 6.9 | 5 | 79 |
| 5 | 24 | 4.80 | 4,444 | 10 | 7.0 | 6 | 76 |
| 6 | 29 | 4.83 | 5,314 | 12 | 7.0 | 7 | 74 |
| 7 | 34 | 4.85 | 6,184 | 14 | 7.03 | 8 | 72.8 |
| 8 | 39 | 4.86 | 7,054 | 16 | 7.03 | 9 | 71.6 |
| 9 | 44 | 4.88 | 7,924 | 18 | 7.04 | 10 | 70.8 |
| 10 | 49 | 4.89 | 8,794 | 20 | 7.05 | 11 | 70.2 |
| 11 | 54 | 4.91 | 9,664 | 22 | 7.05 | 12 | 69.7 |
| 12 | 59 | 4.91 | 10,534 | 24 | 7.05 | 13 | 69.2 |
| 17 | 84 | 4.94 | 14,884 | 34 | 7.1 | 18 | 67.0 |
| Cross linked | | 6.0 | | | 7.98 | 0 | 0 |

As indicated a preferred series of solid phosphite resins or polymers is prepared from triphenyl phosphite and hydrogenated bisphenol A in which the reactants are used in the molecular proportions to provide equal mols of replaceable phenol and hydroxyl groups, i.e. 2 mols of triphenyl phosphite (TPP) and 3 mols of hydrogenated bisphenol A (HBPA).

Varying amounts of phenol are removed from this system to provide increased phosphorus content, increased molecular weights and decreased amounts of free hydroxyl groups. Thus, by reacting the 2 mols of TPP with 3 mols of HBPA and stripping out 4 mols of phenol there is formed a first polymer unit which has the following formula

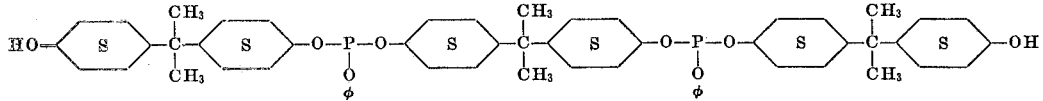

This unit will be referred to hereinafter as a Triad and the letter $n$ used to designate the number of such Triad units in the polymer molecule.

Thus when $n$ is one as in the indicated formula the molecular weight is 964, the phosphorus content is 6.4% and the hydroxyl number is 116.

In the event that 4.5 mols of phenol are stripped out (9 mols from 2 Triads) the formula of the product is

Example 9

The procedure of Example 8 was repeated but the distillation was continued until 1271 parts of distillate were collected. The still residue was a clear solid resin with a phosphorus content of 6.7%. This product is one of the preferred ones according to the invention.

Example 10

The procedure of Example 4 was repeated using 2112 of tris(4-methylphenyl1)phosphite in place of the triphenyl phosphite. There were removed 1280 parts of distillate to give a solid resin.

Example 11

1 part of the resin prepared in Example 4 was mixed with 100 parts of vinyl chloride resin (Geon 103 Ep) to give a stabilized composition.

Example 12

2 parts of the resin of Example 4 were mixed with 100 parts of solid polypropylene (melt index 0.8).

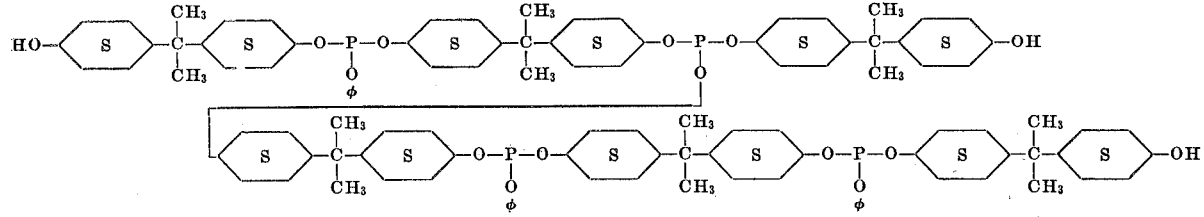

Example 13

1 part of the resin prepared in Example 8 and 2 parts of barium-cadmium laurate were mixed with 100 parts of polyvinyl chloride and 50 parts of dioctyl phthalate to give a stabilized product.

Example 14

1 part of the product of Example 9 was mixed with 100 parts of polypropylene (melt index 0.4).

Example 15

1 part of the resin prepared in Example 8 and 2 parts of barium-cadmium laurate were mixed with 100 parts of a vinyl chloride-acrylonitrile copolymer (60:40, Dynel).

In place of the vinyl chloride resins mentioned above there can be stabilized other halogen containing polymers such as chlorinated polyethylene having 14 to 75%, e.g. 27% chlorine by weight, polyvinyl chloride, polyvinylidene chloride, polyvinyl bromide, polyvinyl fluoride, copolymers of vinyl chloride with 1 to 90%, preferably 1 to 40%, of a copolymerizable ethylenically unsaturated material such as vinyl acetate, vinyl butyrate, vinyl benzoate, allyl acetate, vinyl sterate, vinylidene fluoride, diethyl fumarate, diethyl maleate and other alkyl fumarates and maleates, vinyl propionate, methyl acrylate, ethyl ecrylate, butyl acrylate, 2-ethylhexyl acrylate and other alkyl acrylates, methyl methacrylate, ethyl methacrylate, butyl methacrylate and other alkyl methacrylates, methyl alpha chloroacrylate, styrene, alpha methyl styrene, trichloroethylene, vinyl ethers such as vinyl ethyl ether, vinyl chloroethyl ether, vinyl phenyl ether, vinyl ketones such as vinyl methyl ketone and vinyl phenyl ketone, 1 - fluoro - 1 - chloroethylene, acrylonitrile, chloroacrylonitrile, allylidene diacetate, and chloroallylidene diacetate. Typical copolymers include vinyl chloride-vinyl acetate (96:4 sold commercially VYNW), vinyl chloride-vinyl acetate (87:13), vinyl chloride-vinyl acetate-maleic anhydride (86:13:1), vinyl chloride-diethyl fumarate (95:5) vinyl chloride-trichloroethylene (95:5), vinyl chloride - 2 - ethylhexyl acrylate (80:20) and vinyl chloride-acrylonitrile (60:40).

What is claimed is:

1. A polymer member of the group consisting of a vinyl halide polymer, a vinylidene halide polymer, chlorinated polyethylene, monoolefin polymers, polymers of diolefins having 4 to 5 carbon atoms, polystyrene, cellulose, cellulose acetate, cellulose acetate-butyrate and cellulose nitrate, admixed with a thermoplastic phosphorus containing material having the basic structure

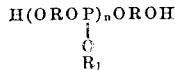

where R is the divalent residue of a member of the group consisting of (a) bis(hydroxyalkyl)benzenes and (b) hydrogenated dihydric phenols, $R_1$ is selected from the group consisting of aryl, alkyl and haloaryl and $n$ is an integer.

2. A mixture according to claim 1 where $n$ is 2.
3. A mixture according to claim 2 wherein said polymer member is a vinyl chloride resin and the phosphorus containing material is present in an amount sufficient to stabilize the vinyl chloride resin.
4. A mixture according to claim 1 wherein $n$ is 2 and said polymer member is a member of the group consisting of monoolefin polymers, polymers of diolefins having 4 to 5 carbon atoms, and polystyrene.
5. A mixture according to claim 2 wherein the phosphorous containing material has the formula

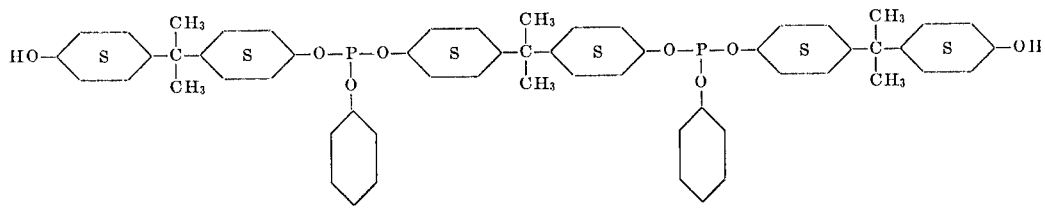

and, said polymer member is a vinyl chloride resin and the phosphorus containing material is present in an amount sufficient to stabilize said resin.

6. A mixture according to claim 1 wherein $n$ is 2, the phosphorus containing material has the formula

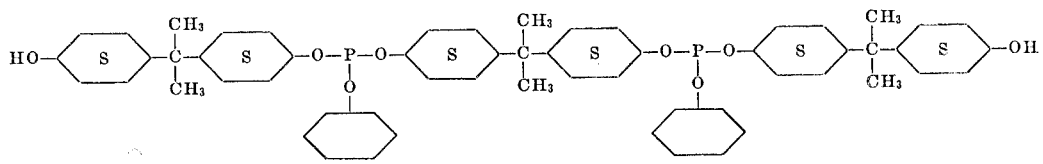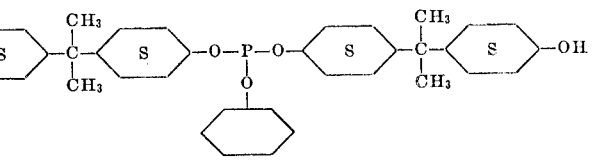

and said polymer member is a member of the group consisting of monoolefin polymers, polymers of diolefins having 4 to 5 carbon atoms, and polystyrene.

7. A mixture according to claim 1 wherein $n$ is 2, $R_1$ is aryl and said polymer member is a vinyl chloride resin and the phosphorus containing material is present in an amount sufficient to stabilize said resin.

8. A mixture according to claim 1 wherein $n$ is 2, $R_1$ is aryl and said polymer member is a member of the group consisting of monoolefin polymers, polymers of diolefins having 4 to 5 carbon atoms, and polystyrene.

9. A polymer member of the group consisting of a vinyl halide polymer, a vinylidene halide polymer, chlorinated polyethylene, monoolefin polymers, polymers of diolefins having 4 to 5 carbon atoms, polystyrene, cellulose, cellulose acetate, cellulose acetate-butyrate and cellulose nitrate admixed with a branched phosphorus containing polymer having the formula

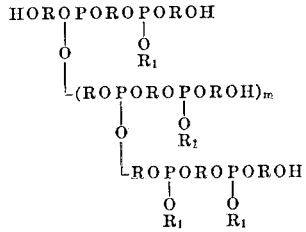

where R is the divalent residue of a member of the group consisting of (a) bis(hydroxyalkyl)benzenes and (b) hydrogenated dihydric phenols, $R_1$ is selected from the group consisting of aryl, alkyl and haloaryl and $m$ is an integer of at least zero.

10. A mixture according to claim 9 wherein $R_1$ is aryl.

11. A mixture according to claim 9 where $m$ is zero.

12. A mixture according to claim 11 wherein said plastic member is a vinyl chloride resin and the phosphorus containing polymer is present in an amount sufficient to stabilize the vinyl chloride resin.

13. A mixture according to claim 12 wherein R is the residue of 4,4'-isopropylidene dicyclohexanol.

14. A mixture according to claim 13 wherein $R_1$ is aryl of the phenyl series.

15. A mixture according to claim 14 wherein $R_1$ is phenyl.

16. A mixture according to claim 9 wherein $m$ is zero and said polymer member is a member of the group consisting of monoolefin polymers, polymers of diolefins having 4 to 5 carbon atoms, and polystyrene.

17. A mixture according to claim 16 wherein R is the residue of 4,4'-isopropylidene dicyclohexanol.

18. A mixture according to claim 17 wherein $R_1$ is aryl of the phenyl series.

19. A mixture according to claim 9 where $m$ is 1.

20. A mixture according to claim 19 wherein said polymer member is a vinyl chloride resin and the phosphorus containing polymer is present in an amount sufficient to stabilize the vinyl chloride resin.

21. A mixture according to claim 20 wherein R is the residue of 4,4'-isopropylidene dicyclohexanol.

22. A mixture according to claim 21 wherein $R_1$ is aryl of the phenyl series having up to one alkyl group attached to the phenyl nucleus.

23. A mixture according to claim 22 wherein $R_1$ is phenyl.

24. A mixture according to claim 9 wherein said polymer member is a member of the group consisting of monoolefin polymers, polymers of diolefins having 4 to 5 carbon atoms, and polystyrene.

25. A mixture according to claim 24 wherein R is the residue of 4,4'-isopropylidene dicyclohexanol.

26. A mixture according to claim 25 wherein $R_1$ is aryl of the phenyl series.

27. A polymer member of the group consisting of a vinyl halide polymer, a vinylidene halide polymer, chlorinated polyethylene, monoolefin polymers, polymers of diolefins having 4 to 5 carbon atoms, and polystyrene admixed with a thermoplastic trivalent phosphorus containing material having as the sole substituents attached to the phosphorus —OROH and —OR$_1$ where R is the divalent residue of either a bis(hydroxyalkyl)benzene or hydrogenated dihydric phenol and $R_1$ is either aryl, alkyl or haloaryl, there being at least one R and at least one $R_1$ in the molecule.

References Cited

UNITED STATES PATENTS

| | | | |
|---|---|---|---|
| 2,612,488 | 9/1952 | Nelson | 260—47 |
| 3,341,629 | 9/1967 | Larrison | 260—897 |

FOREIGN PATENTS 978,285  12/1964  Great Britain.

MURRAY TILLMAN, *Primary Examiner.*

J. WHITE, *Assistant Examiner.*